Jan. 19, 1960
L. KIPP
2,921,490
MEANS FOR CUTTING THREADS
Filed Sept. 28, 1954
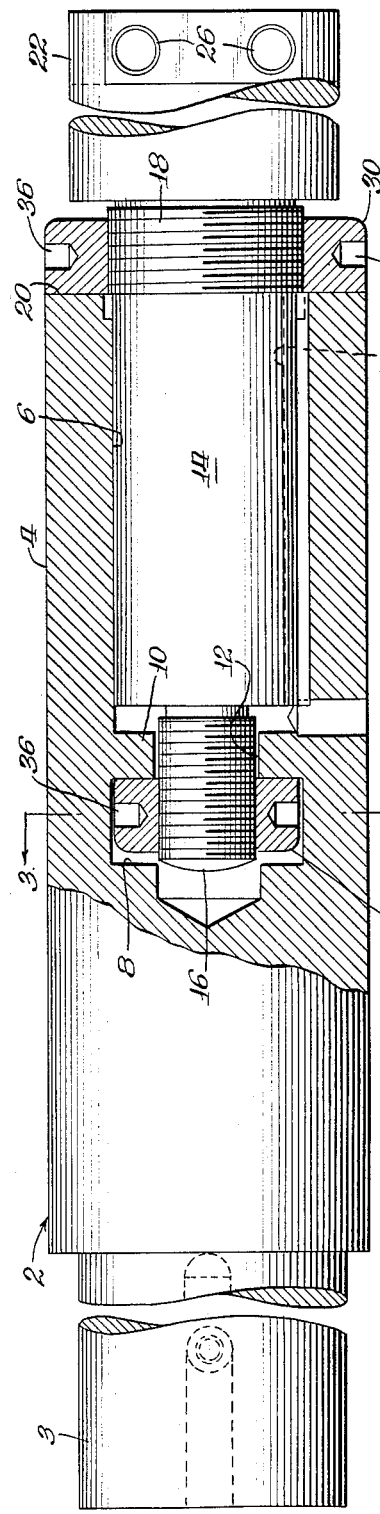
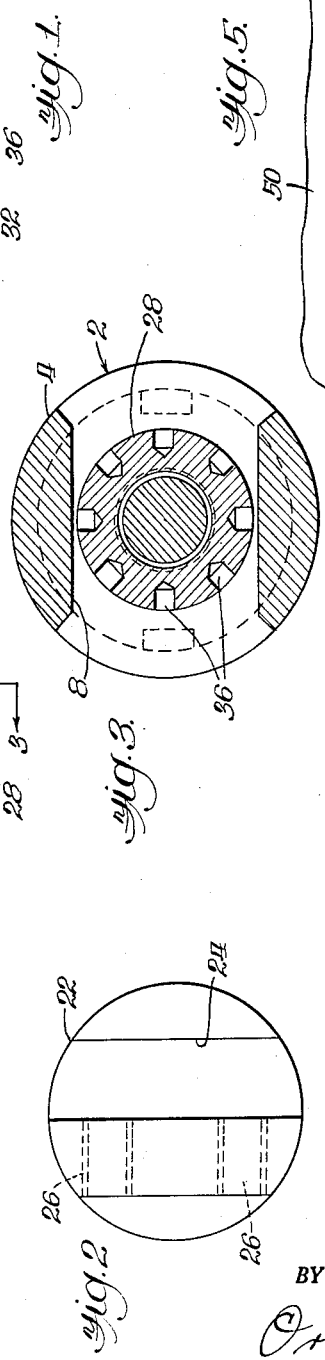
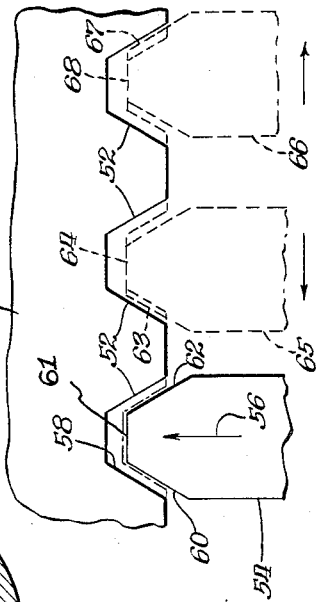
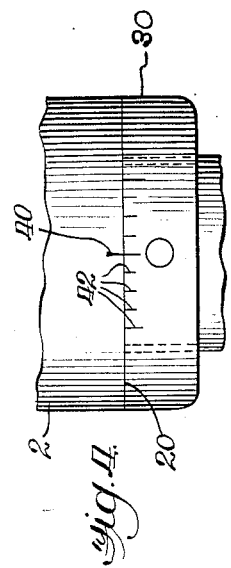
INVENTOR.
Louis Kipp
BY
Orrin O.B. Garner Atty.

United States Patent Office 2,921,490
Patented Jan. 19, 1960

2,921,490

MEANS FOR CUTTING THREADS

Louis Kipp, Cincinnati, Ohio, assignor to American Steel Foundries, Chicago, Ill., a corporation of New Jersey Application September 28, 1954, Serial No. 458,817

1 Claim. (Cl. 82—34)

This invention relates to means for cutting certain types of threads.

As is well known to those skilled in the art, certain types of machines, as for example a lathe or vertical boring mill, are frequently used to cut threads on a given work piece. When thread cutting is accomplished in a machine of this nature, the cutting tool is mechanically interlocked with a lead screw on the machine, whereby the tool is positively urged to pass over the work with a given lead which corresponds to the pitch of the thread to be cut. This lead is determined by the particular gears in the mechanical train which interlocks the lead screw and the movable tool. The usual procedure is to first mechanically interlock the tool and the lead screw and then set the tool to the desired depth of cut. The tool is then successively passed over the work, the depth of cut being reset for each pass. As frequently happens, the tool begins to chatter under the operation when the desired or optimum depth of cut is properly set. This of course causes unwanted marks on the threads of the work piece and a generally undesirable product. Heretofore, when tool chatter occurs, it has been the practice for the machine operator to merely reduce the depth of cut thereby taking a lighter cut and prolonging the time to finish thread cutting operation. This is thought obvious in view of the fact that if lighter cuts are taken, more passes are required to finish the threading sequence.

With certain types of threads, hereinafter discussed more particularly, it has been discovered that the optimum depth of cut can be achieved during all tool passes by resetting the tool axially of the direction of the tool movements whereby the tool will cut more heavily on one side of the thread than on the other side. It has been found that when this axial set-off is employed, the initial cuts may be extremely heavy thereby facilitating and speeding up the thread cutting operation. The thread is finished by resetting the tool in neutral position and final passes taken with the threading tool in neutral position. It has been found that when this sequence or method is employed, optimum cutting depths may be utilized without chattering developing.

Accordingly, it is a primary object of the invention to provide a novel means for cutting certain types of threads and avoiding tool chatter which frequently develops.

It is a particular object of the invention to provide a novel boring bar utilizable in certain thread cutting operations having adjustable means thereon, whereby the cutting tool may be off-set or adjusted in the direction of tool movement.

These and other objects of the invention will become apparent in the course of the following description and from an examination of the concerned drawings, wherein:

Figure 1 is a side elevational view, partly in section, illustrating the boring bar employed in the invention, Figure 2 is an end elevational view taken from the right of the structure shown in Figure 1, Figure 3 is a sectional view taken along line 3—3 of Figure 1, Figure 4 is a fragmentary view illustrating the seal means employed in the invention, and Figure 5 is a fragmentary view of a tool engaging a work piece and illustrating the thread cutting method employed.

Directing attention to Figure 1, it will be seen that the boring bar comprises a fixed member, indicated generally at 2, said member having a cylindrical portion 3 at one end thereof which is adaptable to be received in the ram of a boring mill, or other similar tool holding equipment. The fixed bar 2 additionally comprises a main segment 4 having at one end thereof a hollow 6 formed therein, said hollow being opened at the tool holding end of the bar. A slot 8 is formed in the bar 2 and extends transversely thereof through the bar. The slot 8 is separated from the hollow 6 by a shoulder 10, said shoulder defining an aperture 12, which establishes communication between the hollow 6 and the slot 8.

An adjustable bar 14 is disposed to have one end thereof positioned within the hollow 6, said bar having on this end a reduced diameter threaded portion 16 which extends through the aperture 12 and into the slot 8. On the other end of the adjustable bar 14 another threaded portion 18 is provided, said threaded portion 18 being, in the assembled position of the bars, located immediately adjacent the flat abutment at the right hand end 20 and the fixed bar 2. An enlarged portion 22 is provided on the outboard end of the adjustable bar 14 immediately adjacent the threaded portion 18, said enlarged portion 22 being provided with a slot 24 to receive a thread cutting tool (not shown). The portion 22 is additionally provided with tapped set screw holes 26, 26, said tapped holes being arranged in perpendicular to the long axis of the slot 24. The holes 26 receive set screws (not shown) whereby the thread cutting tool may be securely locked in the slot 24 as is well understood by those skilled in the art.

A locking nut 28 is positioned in the slot 8 and arranged to threadably engage the portion 16 of the adjustable bar 14. Another locking nut 30 is threadably engaged with the portion 18 of the bar 14 and arranged to abut the surface 20 of the bar 2. It should be noted that the nut 28 abuts one side of the shoulder 10. Key means indicated at 32 having a long axis extending parallel to the axes of the bars 2 and 14 interconnects the bars 2 and 14 in the area intermediate the threaded portions 16 and 18. They key means 32 serve to lock the bars 2 and 14 against relative rotational movement therebetween about the long axes of the bars while accommodating relative longitudinal movement between the bars, as will be hereinafter more fully described. The locking nuts 28 and 30 are provided with a plurality of drilled holes 36, which afford convenient means for a spanner wrench or other similar tool to engage the associated lock nut whereby the nuts may be rotated on their respective threaded portions.

Directing attention to Figure 4, it will be seen that the fixed bar 2 is provided with a neutral score mark 40 immediately adjacent the nut 30. Additionally, the nut 30 is provided with a plurality of score marks 42 about the periphery thereof, said score marks being graduated a predetermined amount whereby the relative rotational position of the nut 30 in relation to the bar 2 may be indicated. It should be noted that the score marks 42 are graduated in proportional relation to the pitch of the threads on the portion 18 whereby the relative rotational position of the nut 30 is indicative of the axial movement between the bars 2 and 14 due to a given amount of rotation of the nut 30. Locking nut 28 may be similarly seated.

Directing attention to Figure 5, it will be seen that a work piece is indicated generally at 50, it being desired to cut conventional Acme threads 52 therein. In the normal operation, and that heretofore employed in the art, an Acme cutting tool 54 was fed inwardly toward the axis of the piece as indicated by the arrow 56 in determined stages and the tool successively passed over the work piece until the tooth form 58 corresponded to the form of the cutting tool 54. It should be noted that as the tool 54 is passed over the work, it cuts on three sides, that is at 60, 61 and 62, to form the thread 58. The depth of cut or amount of metal moved per pass at the edges 60 and 62 will be equal with the normally employed method. In this circumstance it has been known that tool chattering would frequently result even with sharp tools when the tool was fed into the work an optimum amount, that is, after a few initial passes and before the thread cutting operation was completed, tool chatter would occur which would spoil the tooth form, thus making it necessary for the machine operator to reduce the amount of feed. It has been discovered that this tool chatter may be avoided by off-setting the tool axially of its direction of movement whereby the tool would cut only on the surfaces 63 and 64 as indicated by the dotted tool at 65 (Figure 5). Obviously the off-setting could not be continued in one direction during too many passes at the work because, at a certain tool depth, the thread form would no longer correspond to that desired. Consequently, it was found desirable to alternately off-set the tool first in one direction and then in the other as indicated at 66 in Figure 5. It will be seen that tool 66 is now off-set in a direction opposite to that of tool 65 whereby the tool cuts primarily in edges 67 and 68, namely, on the opposite side of the thread form. As the thread form 58 approaches its desired contour the tool is reset in neutral or normal position illustrated at 54 and the final few passes are taken with the tool cutting on all edges. When this alternating tool setting is utilized, it has been found maximum or optimum depth of cut can be used for each pass without tool chatter thereby materially increasing the rate at which the thread may be cut. Satisfactory results may also be attained where the tool is off-set to such a degree that it will still cut on both sides of the tool form though cutting more heavily on one side than the other.

Directing attention again to Figures 1 through 4, it will be seen that the boring bar therein disclosed is peculiarly adaptable to the practice of the improved thread cutting method in view of the fact that the adjustable tool holding bar 14 is readily movable axially of the bars. If it is desired to move the bar 14 to the right as seen in Figure 1, the locking nut 28 may be loosened a particular amount and the locking nut 30 may be tightened a particular amount until the nut 28 is again brought into tight relationship with the shoulder 10 at which point the bar and gear tool will be securely locked in position. If it is desired to move the bar 14 to the left, as seen in Figure 1, the nut 30 may be loosened and the nut 28 tightened until the nut 30 is brought into the desired engagement with the abutting surface of the bar 2. Again the bar 14 is securely locked in the desired position. Utilizing the graduated scale illustrated in Figure 4, it will be apparent that the bar 14 may be easily alternately set first on one side of a neutral position and then on the other side for successive tool passes. Additionally, the bar may be accurately reset in neutral position for the final few passes with the tool which finishes off the thread.

It will be readily understood by those skilled in the art that this method of tool cutting is peculiarly adaptable to cutting threads of the illustrated Acme type and additionally may be utilized to cut threads of the American Standard, the Sharp V, the Wentworth and Buttruss type threads and other type threads of similar contour in cross section.

Thus it will be seen that I have provided a novel method of thread cutting which eliminates tool chatter difficulty frequently found in the art as heretofore practiced and have provided a novel boring bar readily adaptable to the practice of the method in thread cutting operations.

What is claimed is:

In an adjustable boring bar arrangement for use in thread cutting on a rotating workpiece, a fixed bar having an open ended hollow at one end thereof, a slot extending transversely through the bar axially adjacent the hollow, a shoulder separating the hollow from the slot, said shoulder defining an aperture communicating between the hollow and the slot, an adjustable bar having tool holding means on the outer end, a threaded portion adjacent the outer end of the adjustable bar, another threaded portion on the inner end of the adjustable bar, said adjustable bar being positioned in the hollow with the tool holding end extending outwardly of the fixed bar and the other threaded portion extending through the aperture and into said slot, means interconnecting the bars operative to prevent relative rotational movement while accommodating relative axial movement therebetween, a first locking nut threadably engaging the first mentioned threaded portion and abutting the end of said fixed bar, and a second locking nut disposed in said slot and threadably engaging the second mentioned portion and abuttable with said shoulder for rigidly locking said adjustable bar in a selectable adjusted position.

References Cited in the file of this patent

UNITED STATES PATENTS

| 257,004 | Hawkins | Apr. 25, 1882 |
| 934,147 | Dubuque | Sept. 14, 1909 |
| 1,801,883 | Smith | Apr. 21, 1931 |
| 2,011,208 | Williams | Aug. 13, 1935 |
| 2,125,005 | Jearum | July 26, 1938 |
| 2,136,642 | Starkweather | Nov. 15, 1938 |
| 2,159,308 | Anthony | May 23, 1939 |
| 2,211,183 | Tytus et al. | Aug. 13, 1940 |

OTHER REFERENCES

American Machinist, page 134, Aug. 1, 1946.

Publication, Thread cutting methods, by Franklin D. Jones, published by The Industrial Press, New York, first edition, 1918, page 17 only.